(12) United States Patent
Levin et al.

(10) Patent No.: US 6,588,595 B2
(45) Date of Patent: Jul. 8, 2003

(54) ANTI-MOTOR FRET PACKAGE FOR MULTIPLE DISK DRIVES

(75) Inventors: Stephen Levin, Boulder, CO (US); Terence Ten Teck Hong, Singapore (SG); David Duell, Scotts Valley, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/845,605

(22) Filed: Apr. 26, 2001

(65) Prior Publication Data

US 2002/0033352 A1 Mar. 21, 2002

Related U.S. Application Data

(60) Provisional application No. 60/232,811, filed on Sep. 15, 2000.

(51) Int. Cl.⁷ .................... B65D 81/107; B65D 81/113; B65D 85/30
(52) U.S. Cl. ........................................ 206/589; 206/523
(58) Field of Search ............................... 206/320, 443, 206/523, 589, 592

(56) References Cited

U.S. PATENT DOCUMENTS 5,706,951 A * 1/1998 Oinuma et al. .............. 206/592
6,010,007 A * 1/2000 Moren et al. ................ 206/454
6,142,304 A * 11/2000 Moren et al. ................ 206/454

OTHER PUBLICATIONS

Applicant Prior Art: Top cover of container, Maxtor Corporation, Longmont, CO, illustrated in Fig. 14 of application.
Prior Art Container: Quantum, Inc. Milpitas, CA, illustrated in Fig. 15 and 16 of application.
Prior Art Container: Seagate, Inc., Scotts Valley, CA, illustrated in three photographs (1–3); illustrated in three additional photographs (4–6).
Applicant Prior Art: Top cover of container, Maxtor Corporation, Longmont, CO, illustrated in Fig. 4 of application.
Prior Art Container: Quantum, Inc. Milpitas, CA, illustrated in Fig. 15 of application.
Prior Art Container: Seagate, Inc., Scotts Valley, CA, illustrated in three photographs.

* cited by examiner

Primary Examiner—David T. Fidei
(74) Attorney, Agent, or Firm—Sheridan Ross P.C.

(57) ABSTRACT

An anti-motor fret package/container is provided including a main insert, a top cover, and a cardboard shell. The package is especially adapted for securing computer disk drives therein. Potential damage to the computer disk drives is minimized by isolating any movement of the disk drives within the package. A central rib, displacement means, or contacting means are provided to press or hold the disk drives tightly against side walls of their loading compartments. Movement of the disk drives within the package is particularly constrained in the lateral or transverse direction to avoid the phenomena known as motor fret. The overall arrangement and construction of the package minimizes vibration and shock transferred to the disk drives during shipment.

39 Claims, 5 Drawing Sheets

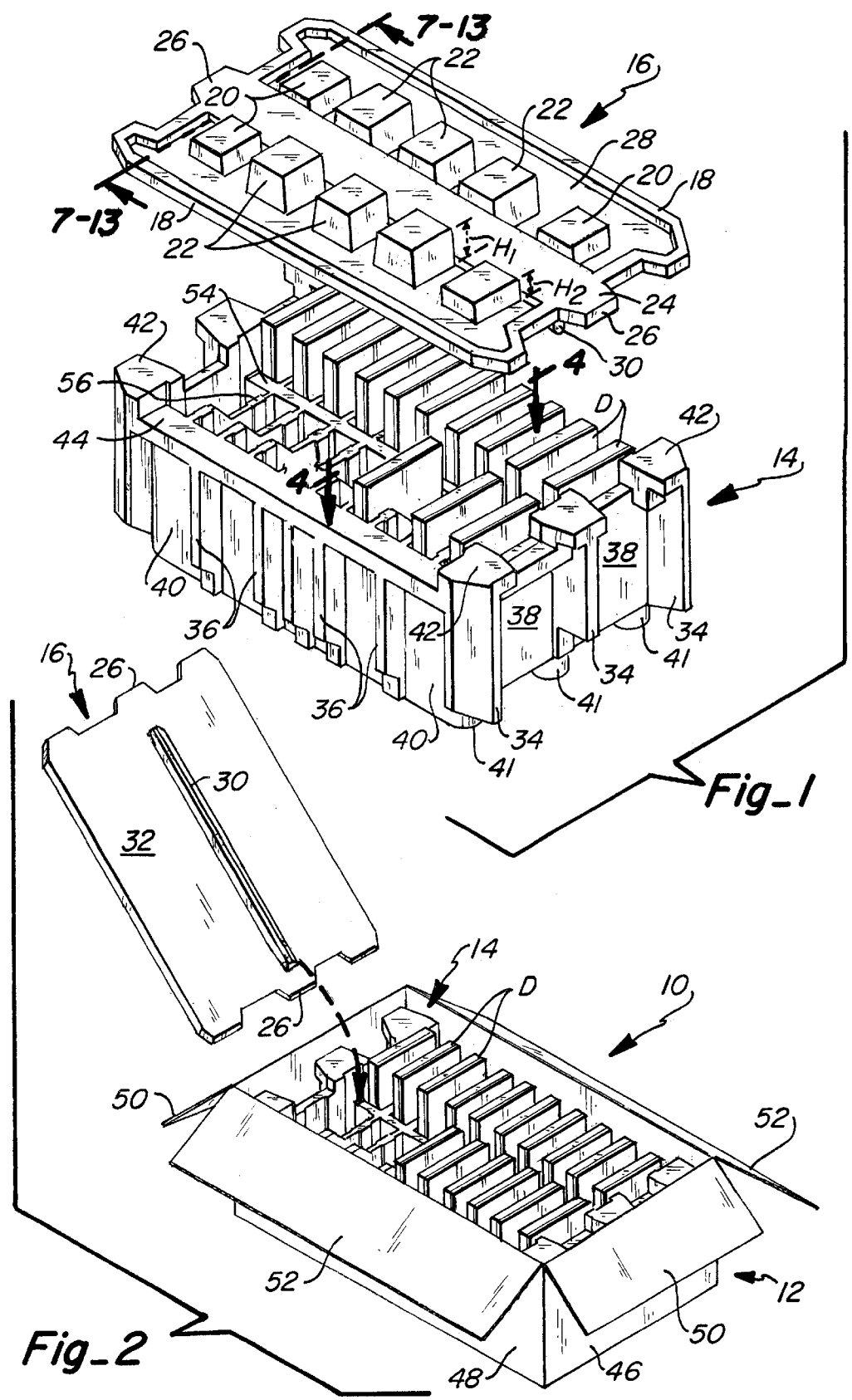

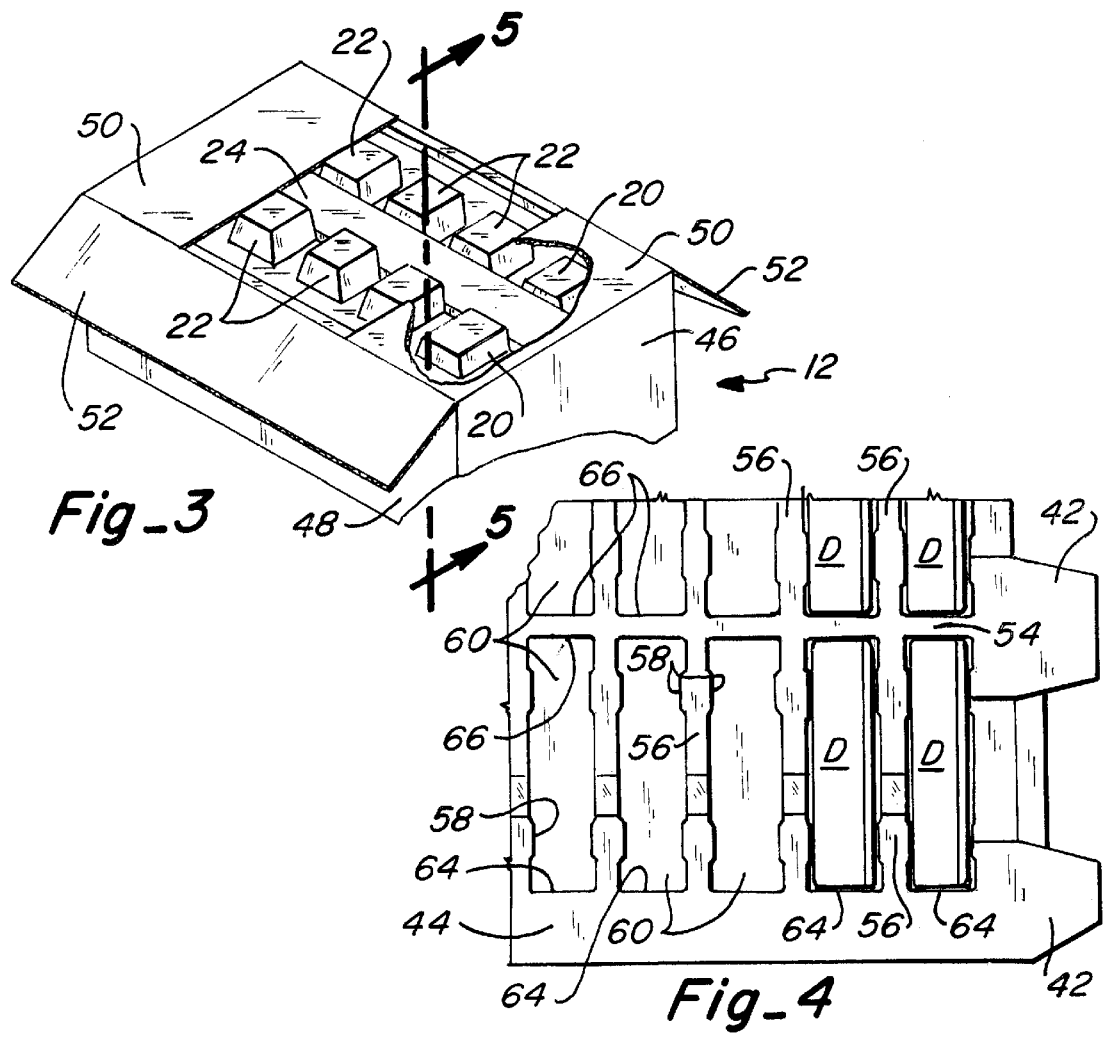
Fig_3
Fig_4
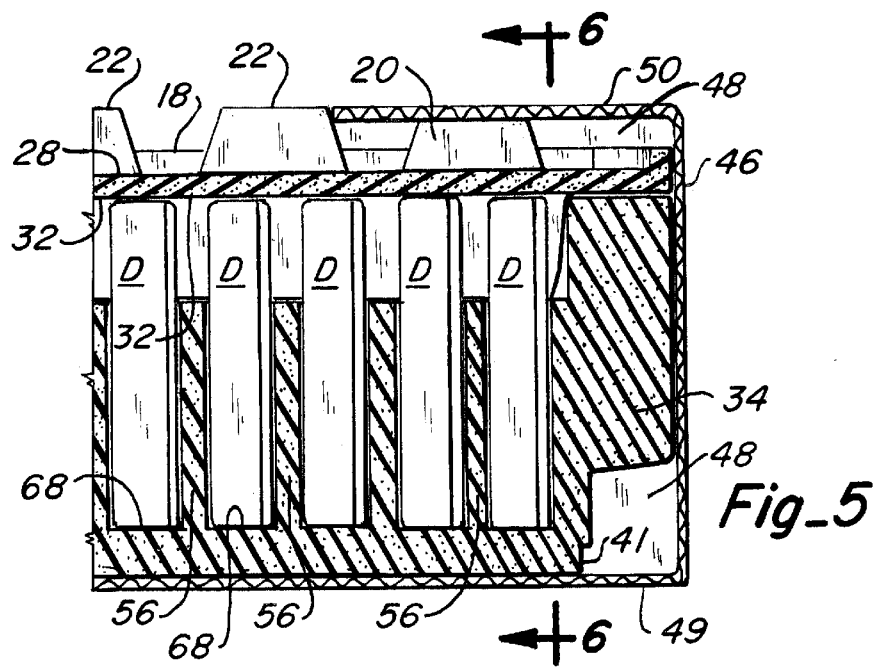
Fig_5

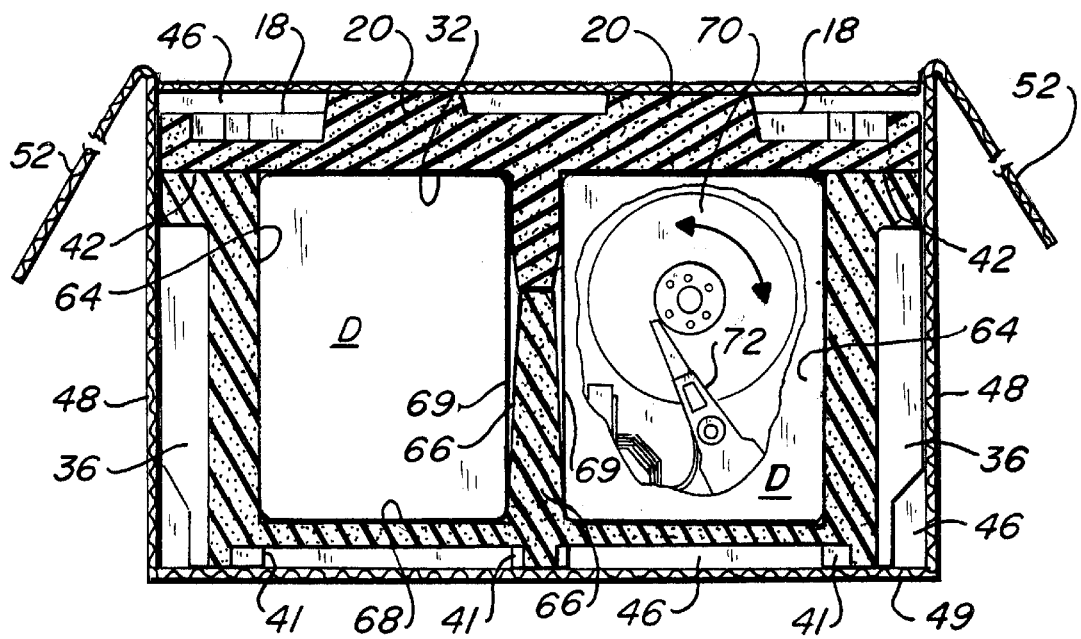
*Fig_6*
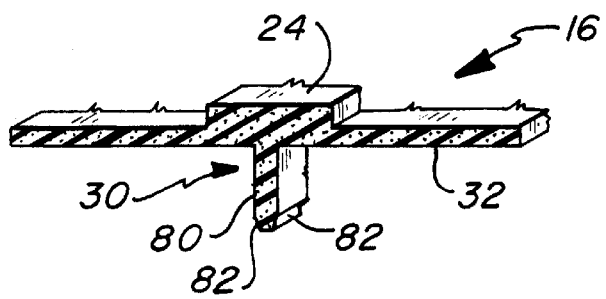
*Fig_7*
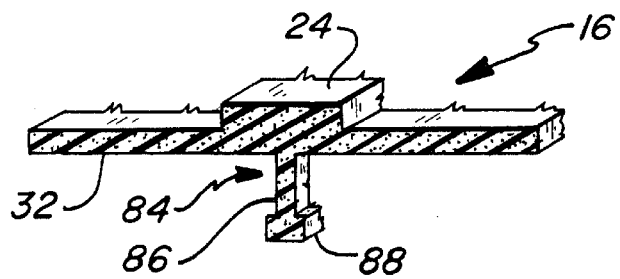
*Fig_8*

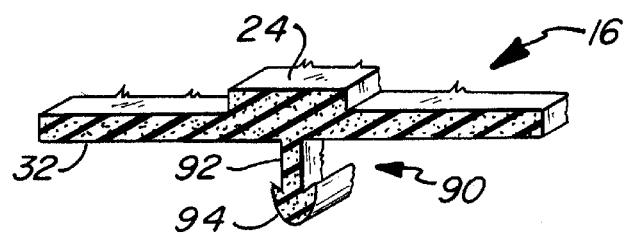
*Fig_9*
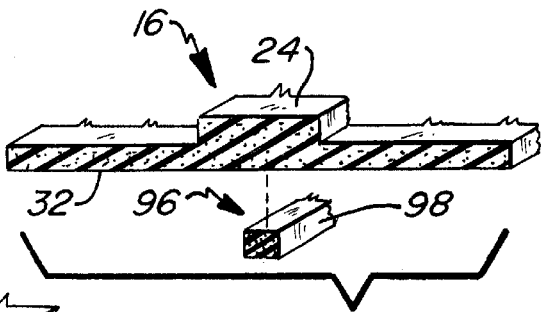
*Fig_10*
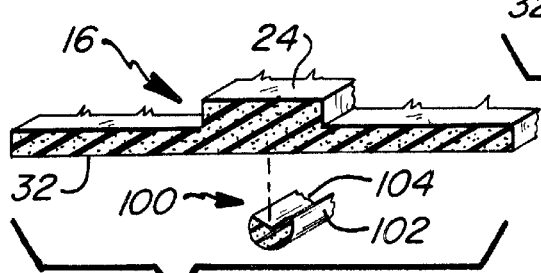
*Fig_11*
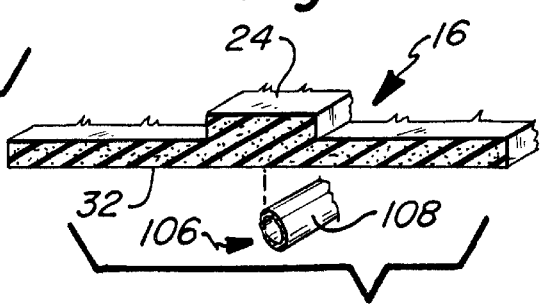
*Fig_12*
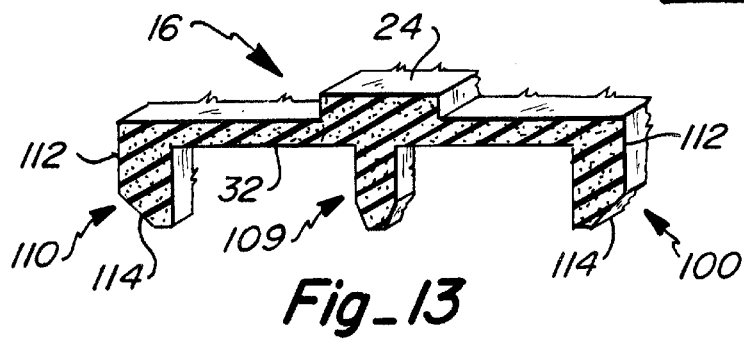
*Fig_13*
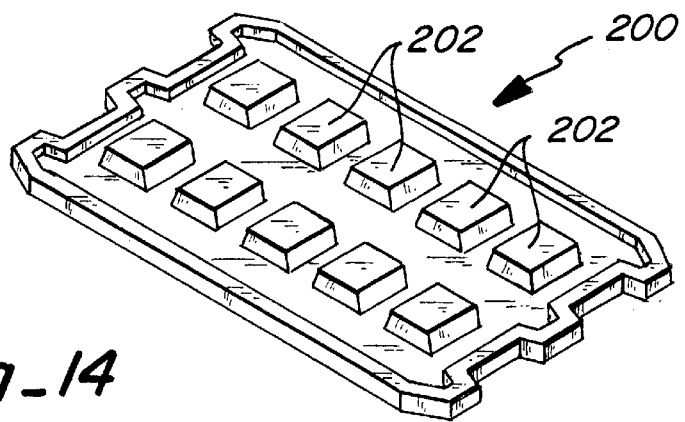
*Fig_14*
PRIOR ART

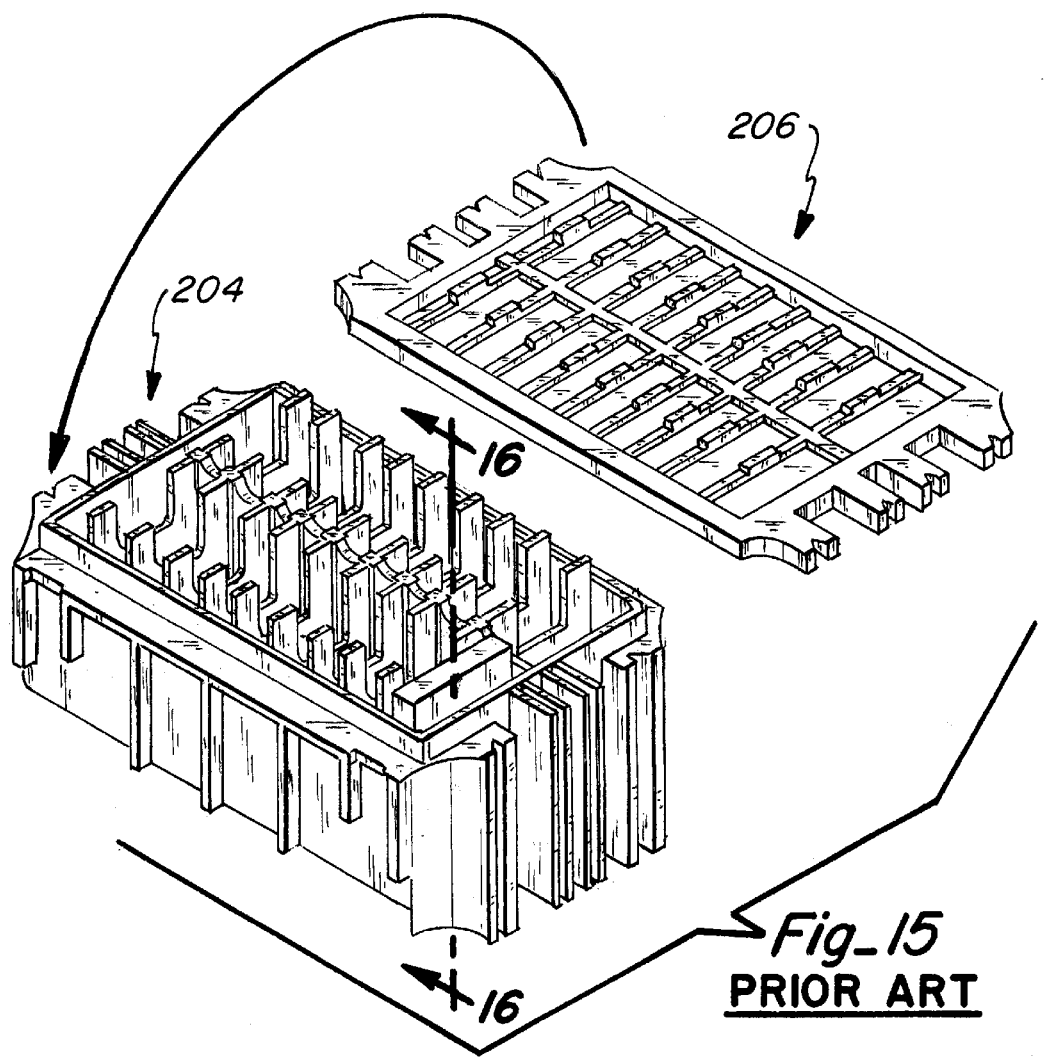
Fig_15
PRIOR ART
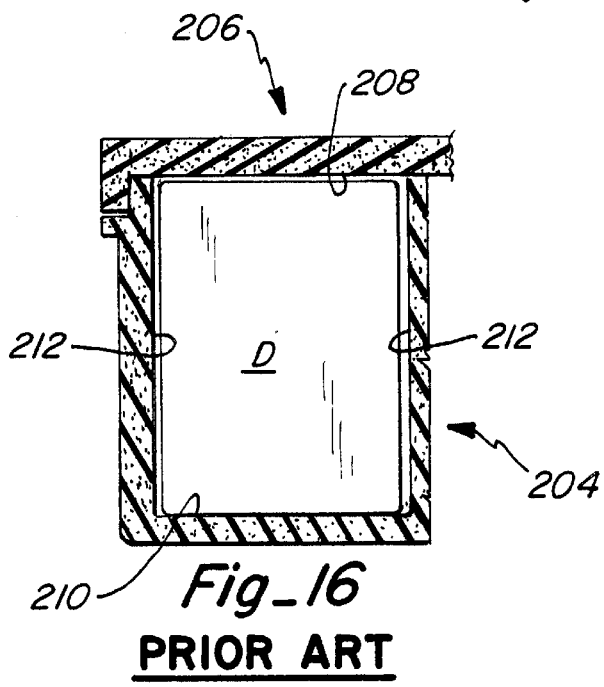
Fig_16
PRIOR ART

ANTI-MOTOR FRET PACKAGE FOR MULTIPLE DISK DRIVES

CROSS REFERENCE TO RELATED APPLICATIONS

Priority is claimed from U.S. Provisional Patent Application No. 60/232,811, filed on Sep. 15, 2000 and entitled "Anti-Motor Fret Package for Multiple Disk Drives" and further identified as the disclosure of which is incorporated herein by reference in its entirety.

FIELD OF THE INVENTION

The present invention relates to a container or package used for shipment and storage of computer disk drives, and more particularly, the present invention relates to an anti-motor fret package for multiple disk drives which protects the computer disk drives from vibration and shock which may occur during shipment and storage.

BACKGROUND OF THE INVENTION

Computer disk drives are common to personal computers, laptop computers, and other computing devices. As with any product, computer disk drives at some point in time must be shipped from a manufacturer or distributor to another location where the disk drives may be used. As understood by those skilled in the art, computer disk drives are precision electromechanical devices which electronically store data and allow data to be manipulated in accordance with the functioning of computing device in which the disk drives are installed. A computer disk drive includes one or more disks or platters which rotate at high RPMs and are driven by a spindle motor. Because of the advances in the manufacture of disk drives, many disk drives now have thicker platters or disks which weigh more and, thus, have more inertia during rotation. Each computer disk drive also includes at least one read/write component known as the "head" which reads and writes data to and from its corresponding platter. During shipment, a disk drive is shipped with its head in the "landing zone." The "landing zone" is an area on a platter where the head is positioned when the disk drive is not in use. In previous disk drive construction, the contact of a head against its corresponding platter in landing zone created enough friction to prevent the platter from any rotational movement during the shipment. However, refinements in the construction of some computer disk drives have also resulted in fewer and/or smaller heads being used. Accordingly, for these newer types of disk drives, there is not enough friction between the smaller heads and the landing zone corresponding with each platter to prevent the platters from rotating due to vibration or shock during shipment. Vibrations experienced by these types of disk drives during shipment can cause the platters to partially rotate in repetitive back and forth motions. These small, partial rotations of the platters cause the lubrication to be displaced or separated from the ball bearings and bearing races within the spindle motors which drive the platters. As grease or lubricant separates from the ball bearings and bearing races, the bearings and races become damaged from lack of proper lubrication. This damage is called "motor fret." When the disk drive is then installed in a computer, the motor fret is significant enough to result in increased motor noise, typically from three to eight decibels. This increase in noise is a defect which makes the disk drive unsuitable for sale to a consumer.

Most multi-pack boxes which are used for shipment of computer disk drives arrange the disk drives on edge and orient them transversely with respect to the long axis of the box. Unfortunately, pronounced vibrations can occur to a disk drive during shipment in such containers. Transverse or side-to-side vibration during shipment results in motor fret.

SUMMARY OF THE INVENTION

In accordance with this invention, an anti-motor fret package or container is provided which prevents motor fret. Although the present invention involves a combination of elements, there is also utility with respect to various sub-combinations to include a top cover and stabilizing member used in the package. Also in accordance with the invention, methods are provided which facilitate shipment of computer disk drives in a way to avoid motor fret.

In its simplest form, the package or container of the invention includes three major components, namely, a main insert, a top cover, and a cardboard shell. The main insert is constructed of expanded polypropylene material molded to include a plurality of compartments to receive disk drives loaded therein. The compartments are arranged in one or more rows extending longitudinally along the length of the package. The top cover is placed over the main insert and contacts the upper surfaces of the disk drives. A stabilizing member in the form of a central rib communicates with the top cover, and extends longitudinally along the row(s) of disk drives to particularly constrain the disk drives from lateral or transverse movement within their respective compartments. In some embodiments, the central rib is attached to the lower surface of the top cover while other embodiments separate the central rib from the top cover. The main insert, top cover, and central rib are housed within the cardboard shell which is in the form of a corrugated cardboard box.

Typically, the main insert includes two parallel rows of compartments for holding a plurality of disk drives. A longitudinally extending gap separates the rows of disk drives. The central rib is positioned so that it extends along and fills this gap, and makes contact with the disk drives pushing or displacing them transversely against outer edges or walls of their respective compartments. The central rib particularly constrains the disk drives from lateral or transverse motion within their respective compartments, thus minimizing motor fret induced by undesirable transverse or lateral vibration.

Disk drives that are prepared for shipment are often placed in a flexible plastic bag or container for various reasons, including preventing a static charge from damaging the drives. Thus, the disk drives do not have a completely uniform and rigid shape during shipment because of the plastic bag or containers. The main insert compartments could be sized for a tight friction fit with the loaded disk drives; however, this might rip or tear the containers. Furthermore, it is undesirable to have the disk drives firmly wedged within the main insert compartments because it makes the disks drives difficult to load and remove, and damage can occur to the disk drives merely by loading or removing them. The central rib constrains the disk drives within their respective compartments and prevents any movement or displacement of the disk drives; however, the central rib is easily removed which allows the disk drives to be loaded and removed without damage and without undue physical effort.

The central rib in a first preferred embodiment is simply a substantially rectangular shaped extension protruding from the lower surface of the top cover. Other preferred embodiments are disclosed herein which provide different shapes of the central rib. Yet other embodiments are disclosed wherein the central rib is a separate piece which is not permanently attached to the top cover.

Like the main insert, the top cover and central rib may be made of expanded polypropylene or other well known molded packing materials. Additionally, it is contemplated within this invention that the central rib can be made of any type of suitable material which has the strength and resiliency to displace and hold the computer disk drives in their contact positions against the outer walls of their respective compartments. For example, the central ribs could be constructed of plastic, wood, or cardboard, or the central rib could be made of a sufficiently rigid inflatable member.

There are numerous advantages to the invention. First, motor fret can be substantially reduced, if not eliminated. No or minimal changes are required of either the main insert or the cardboard shell. In fact, the only required structural modification to the overall package is the inclusion of the central rib. The disk drives are easily inserted and removed from their respective compartments because the size of the compartments do not have to be modified. In addition to protection from vibration, the disk drives are still protected from normal shock which may occur during shipment (for example, inadvertent dropping or slamming of the package against another object). More importantly, the construction of the newer types of disk drives do not have to be modified to reduce motor fret. These and other advantages will become apparent from the description which follows, taken in conjunction with the accompanying drawings.

BRIEF DESCRIPTION OF THE DRAWINGS

FIG. 1 is a perspective view illustrating a top cover and main insert of the anti-motor fret package of the invention;

FIG. 2 is a perspective view of the main insert placed in a cardboard shell, and illustrating the lower surface of the top cover having a central rib attached thereto;

FIG. 3 is a perspective view of the package illustrating the top cover placed over the main insert, and showing two flaps of the cardboard shell in a folded position; FIG. 4 is a fragmentary enlarged plan view taken along line 4—4 of FIG. 1;

FIG. 5 is an enlarged fragmentary vertical section taken along line 5—5 of FIG. 3;

FIG. 6 is an enlarged vertical section taken along line 6—6 of FIG. 5;

FIG. 7 is a greatly enlarged fragmentary perspective view of one preferred embodiment of the top cover, the view taken along line 7–13, 7–13 of FIG. 1;

FIGS. 8–13 each show greatly enlarged fragmentary perspective views of other embodiments of the top cover usable with the package of the invention;

FIG. 14 is a perspective view of a prior art top cover, specifically illustrating the lower surface thereof;

FIG. 15 is a perspective view of a prior art main insert and top cover; and

FIG. 16 is an enlarged fragmentary vertical section taken along line 16—16 of FIG. 15.

DETAILED DESCRIPTION

FIGS. 1 and 2 illustrate the anti-motor fret package/container 10 of the present invention. As shown, the package 10 includes three major components, namely, a cardboard shell 12, a main insert 14, and a top cover 16. Beginning first with the top cover 16, it includes a reinforced/thickened edge 18 extending around the periphery or outer edge of the top cover 16. A plurality of shock pads 20 and 22 are arranged on the upper surface of the top cover 16. The shock pads are shown as having substantially box-like shapes with flat or planar exposed upper surfaces. Intermediate shock pads 22 have uniform heights $H_1$. Two pairs of end shock pads 20 are provided which have uniform lower heights $H_2$ in comparison to the intermediate shock pads 22. A center reinforcing flange 24 extends longitudinally along the top cover. This center flange 24 is simply a thickened or raised area which provides bending strength to the top cover. Each end of the top cover may include a handle extension 26 which eases removal of the top cover from the main insert. The pads 20 and 22 are mounted on the web portion 28 which traverses between the thickened edge 18 and the center flange 24.

Referring now to FIG. 2, the top cover 16 has a lower or bottom surface 32 having a central rib 30 extending longitudinally therealong. The center rib 30 extends substantially perpendicular to the lower surface 32.

The main insert 14 is characterized by a number of features to include end shock ribs 34 protruding from their respective ends of the main insert, and a plurality of lateral or side shock ribs 36 which extend laterally or transversely from the main insert 14. End wall 38 defines the retaining structure at both ends, while side walls 40 define the retaining structure along the lateral sides of the main insert. One or more feet/base extensions 41 are positioned at the bottom or lower surface of the main insert. These extensions 41 are also seen in FIG. 5. A plurality of ledges 42 define upper ends of respective end shock ribs 34. Recessed ledges 44 extend longitudinally along their respective lateral sides of the main insert.

Cardboard shell 12 is simply a cardboard box having end walls 46, side walls 48, bottom 49 (FIG. 5), end flaps 50 and side flaps 52. Now referring to FIGS. 1 and 4, the main insert 14 includes a plurality of compartments 60 formed by a crisscross pattern of internal walls. One common arrangement for main insert 14 is a pair of longitudinally extending compartment rows wherein each of the compartments extends transversely from a center axis or center line of the main insert. This pair of rows is separated by a single central wall or longitudinal wall 54 extending longitudinally along the main insert. A plurality of transverse walls 56 interconnect longitudinal wall 54 and side walls 40. Optionally, transverse walls 56 may include one or more flanges or ribs 58 which extend vertically along the transverse walls 56 and protrude inwardly into the defined compartment 60. Disk drives located in their respective compartments 60 are shown as disk drives D. FIGS. 4 and 5 show no gaps between the drives D and the walls of their respective compartments; however, there are, in fact, small gaps which allow the disk drives to be easily loaded within or removed from their respective compartments. Each of the compartments 60 are further defined by an inner side wall 66 which itself forms one edge of the longitudinal wall 54, each compartment also being defined by an outer side wall 64 which itself forms an interior surface or edge of outer side wall 40. When a disk drive is loaded within a compartment 60, the interior edge of the drive will be adjacent the inner side wall 66 and the exterior edge of the drive wall will be adjacent the outer side wall 64.

Referring back to FIG. 2, once a package is loaded for shipment, the top cover 16 is placed over the main insert. The center rib 30 is aligned in the gap between the rows of drives D, and the center rib 30 pushes the drives D against their respective outer side walls 64 of their respective compartments 60. Preferably, one end of the top cover 16 is placed adjacent the main insert, and the center rib 30 is progressively aligned and forced between the rows of drives D. When in place, the center rib 30 extends continuously between the rows of drives D and prevents any transverse or lateral movement of the drives D within their respective compartments 60.

Referring now to FIG. 6, the center rib 30 is shown in its installed position wherein disk drives D have been forced against their respective outer side walls 64. Accordingly, the primary or major gap which then exists between the walls defining the compartments 60 and the disk drives D is the gap between walls 66 and the interior edges 69 of the disk drives D. The disk drive D includes the platter or disk 70 which normally rotates in the manner as shown. An actuator assembly 72 is shown in its parked position in the landing zone. By preventing any lateral or transverse movement of the disk drive D within the compartment 60, the platter 70 is unable to make its slight rotations or twitches which otherwise cause the motor fret. As also shown in FIG. 6, the lower surface 32 of the top cover sets flush against the upper surfaces of the disk drives D. The drives D are also in contact with the bottom surfaces 68 of their respective compartments 60. Therefore, not only are the drives D constrained within the compartments to prevent lateral or transverse displacement, but also vertical displacement.

In terms of longitudinal displacement of the drives D in their compartments 60, the center rib 30 imparts enough force on the disk drives to prevent any appreciable longitudinal displacement as well. Therefore, even longitudinal vibration or shock which is induced upon the package does not result deleterious effects upon the disk drives loaded in the package.

In order to ease the insertion of the central rib 30 between the rows of disk drives, the central rib may be provided with a slick plastic covering or sleeve (not shown).

Referring back to FIG. 3, yet another advantage of the invention is the specific construction and arrangement of the shock pads 20 and 22. In order to best isolate the disk drives D from any vibration or movement when loaded, the cardboard shell should provide a tight contacting envelope or cover over the top cover 16 and the main insert 14. In other words, it is undesirable to allow movement of the main insert and top cover within the cardboard shell. The main insert 14 fits tightly within cardboard shell 12 such that the ribs 34 and 36 contact the respective cardboard shell walls 46 and 48. End shock pads 20 are slightly lower in height than intermediate shock pads 22 which allows end flaps 52 to set flush against the upper surfaces of end shock pads 20. Then, side flaps 52 may be folded over to set flush against the upper surfaces of intermediate shock pads 22. This arrangement of pads 20 and 22 allows the top portion of the cardboard shell to be in aligned contact with each of the shock pads 20 and 22.

FIG. 7 more specifically illustrates the construction of the center rib 30. As shown, the center rib 30 includes a main extension 80, and a narrowed portion 82 which allows the rib 30 to be more easily placed in the gap between the rows of disk drives D during its initial contact with the drives D. FIGS. 8–13 illustrate variations of the center rib 30, and can be considered other preferred embodiments of the top cover of the invention. FIG. 8 illustrates a center rib 84 having a main extension 86, and a rectangular shaped end 88. FIG. 9 illustrates a center rib 90 including a main extension 92, and an arrow shaped end 94. FIG. 10 illustrates another center rib 96; however, this center rib is not connected to the lower surface 32 of the top cover, but rather is a separate element which is wedged between the row of disk drives D. In this embodiment, the center rib 96 is a longitudinally extending member 98 having a rectangular cross section. FIG. 11 illustrates yet another rib 100 which is also separated from the top cover 16. Rib 100 is shown as a longitudinally extending member having a semi-circular cross section including a notch or gap 104 extending longitudinally along the rib 100. FIG. 12 shows yet another rib 106 which has a cylindrical body 108. FIG. 13 shows a final arrangement of ribs wherein in addition to a central rib 109, a pair of outside ribs 110 are provided which extend longitudinally along the exterior lateral sides of the top cover 16 and protrude from the lower surface 32 of top cover 16. Rib 109 is in the same shape as rib 30. Ribs 110 each include a main extension 112 and narrowed portions 114. The purpose of these outside ribs 110 is to provide additional structure to support the upper exterior edges of the disk drives D once the top cover 16 is placed over the main insert 14. These ribs 110 reside in the gaps which extend longitudinally between ledges 44 and the lower surface 32 of the top cover.

FIG. 14 illustrates a prior art top cover 200, one which was used by the Applicant of this invention. As shown, this top cover 200 includes a plurality of shock pads 202. However, this top cover 200 was used in a manner quite different from the present invention. Specifically, the shock pads 202 were mounted to the lower surface of the top cover, and the shock pads were placed in contact with the upper edges of the disk drives. The upper surface of top cover 200 was simply flat with no shock pads. With the present invention, it was found that by reversing the upper and lower surfaces such that the upper surface of the top cover placed the shock pads in contact with the flaps of the cardboard shell, there was better absorption and distribution of shock and vibration.

FIG. 15 illustrates components of a prior art container which include a main insert 204 and a top cover 206. This particular main insert and top cover is one which has been used by Quantum, Inc. of Milpitas, Calif. As shown in the cross-section of FIG. 16, while a loaded disk drive D may be enveloped by the top cover 206 placed over the main insert 204, there are no means to positively restrict or prevent displacement or movement of the disk drives D within the compartments. The compartments of this prior art container are defined by lower surface 208 of top cover 206, side walls 212, and lower or bottom surface 210. As shown, there are small gaps between the disk drive D and side walls 212, as well as gaps between lower surface 208 and the upper edges of the disk drive D. For illustration purposes, these gaps have been accentuated to illustrate the failure of this particular prior art container to effectively isolate the disk drive D from displacement caused by vibration during shipment.

As a subcombination, the top cover itself has utility. Regardless of the specific type of main insert used, a top cover which incorporates a central rib for contacting a disk drive and prevents displacement of the disk drive in its compartment is advantageous.

While the container of this invention has been described with respect to advantages in the shipment of products such as disk drives, it shall be understood that the present invention is not limited to application solely with disk drives. Vibration induced upon a large number of electromechanical devices can be damaging. Therefore, providing a means to effectively isolate the devices from vibration is particularly desirable when the device cannot be placed in packaging which inherently isolates the device from vibration. Human factors play a large part in how products are packaged. The more difficulty a user encounters when accessing a product within a package, the more undesirable that style of packaging is to the user. According to the present invention, the central rib is easily emplaced and removed by a user. The products loaded in the package are then easily removed, because there is no high friction arrangement between the products and the corresponding compartments.

Although the main insert disclosed herein has two rows of compartments, it shall also be understood that the present invention encompasses any package having at least one row of compartments. In a package having only one row, the central rib 30 would simply be positioned at a location to constrain lateral or transverse movement of the disk drives. Accordingly, the location of the "central" rib would result in the rib being placed in communication with one of the outside longitudinal edges of the top cover.

One aspect important to the present invention is that the central rib should remain in a fixed position once the top cover has been placed over the main insert. Therefore, the rib should not deform, twist, or otherwise displace during shipment. Additionally, the fit of the top cover and the main insert within the cardboard shell should be tight so that, if the package is subject to any vibrations or shock, the entire package must vibrate or displace in response to the induced vibration or shock. Because of the weight of the package and the tightly packed components, deleterious effects of smaller amplitude vibrations can be reduced or eliminated because the package as a whole has to displace or move in reaction to an induced vibration, and such smaller vibrations are absorbed without displacement.

This invention has been described with respect to various disclosed embodiments; however, it will be understood that other modifications can be effected within the spirt and scope of this invention.

What is claimed is:

1. In combination, a package to secure a plurality of computer disk drives therein, said combination comprising:
   a plurality of disk drives, each disk drive having an interior edge and an opposing exterior edge;
   a main insert including a plurality of compartments formed therein to receive the disk drives, said compartments arranged in at least one row extending in a longitudinal direction, each compartment of said plurality of compartments having an inner side wall and an outer side wall;
   a top cover for covering said compartments of said main insert, said top cover including an upper surface and a lower surface;
   a central rib placed in communication with said lower surface, said central rib contacting the interior edges of the disk drives loaded in said compartments thereby displacing the disk drives so that the exterior edges of the disk drives maintain contact with the outer side walls of said main insert and thereby constraining the disk drives from transverse movement in the compartments; and
   a shell enclosing said top cover, said central rib and said main insert.

2. The combination, as claimed in claim 1, wherein:
   said at least one row is arranged in a pair of rows extending parallel to one another and in the longitudinal direction, said central rib contacting the disk drives loaded in both said pair of rows of compartments and constraining the disk drives from transverse movement in their respective compartments.

3. The combination, as claimed in claim 1, furthering including:
   a plurality of shock pads formed on said upper surface of said top cover.

4. The combination, as claimed in claim 1, further including:
   a center flange formed on said upper surface of said top cover and extending in the longitudinal direction, said center flange adding structural support to said top cover.

5. The combination, as claimed in claim 3, wherein:
   said plurality of shock pads includes an end pair of shock pads positioned near an end of said top cover, said plurality of shock pads further including at least a pair of intermediate shock pads spaced longitudinally from said end pair of shock pads.

6. The combination, as claimed in claim 5, wherein:
   said end pair of shock pads have a first height and said pair of intermediate shock pads have a second higher height.

7. In combination, a package to secure a plurality of computer disk drives therein, said combination comprising:
   a plurality of disk drives, each disk drive having an interior edge and an opposing exterior edge;
   a main insert including a plurality of compartments formed therein to receive the disk drives, said compartments arranged in at least one row extending in a longitudinal direction, each compartment of said plurality of compartments having an inner side wall and an outer side wall;
   a top cover for covering said compartments of said main insert, said top cover including an upper surface and a lower surface; and
   means communicating longitudinally along said top cover for contacting and displacing the disk drives thereby causing the exterior edges of the disk drives to maintain contact with the outer side walls of said main insert and thereby constraining the disk drives from transverse movement in their respective compartments.

8. The combination, as claimed in claim 7, wherein:
   said at least one row is arranged in a pair of rows extending parallel to one another and in the longitudinal direction, said means for contacting positioned to contact the disk drives loaded in both said pair of rows of compartments and constraining the disk drives from transverse movement in their respective compartments.

9. The combination, as claimed in claim 7, further including:
   a plurality of shock pads formed on said upper surface of said top cover.

10. The combination, as claimed in claim 7, further including:
    a center flange formed on said upper surface of said top cover and extending in the longitudinal direction, said center flange adding structural support to said top cover.

11. The combination, as claimed in claim 9, wherein:
    said plurality of shock pads includes an end pair of shock pads positioned near an end of said top cover, said plurality of shock pads further including at least a pair of intermediate shock pads spaced longitudinally from said end pair of shock pads.

12. The combination, as claimed in claim 11, wherein:
    said end pair of shock pads have a first height and said pair of intermediate shock pads have a second higher height.

13. In combination, a package to secure a plurality of computer disk drives therein, said combination comprising:
- a plurality of disk drives, each disk drive having an interior edge and an exterior edge;
- a main insert including a plurality of compartments formed therein to receive the disk drives, said compartments arranged in at least one row extending in a longitudinal direction, said plurality of compartments being defined by at least two corresponding side walls, one of said side walls being an outer side wall;
- a top cover for covering said compartments of said main insert, said top cover including an upper surface and a lower surface; and
- means communicating longitudinally along said top cover for contacting the interior edges of the disk drives and for displacing the disk drives to remain in contact with said outer side walls of said compartments to constrain the disk drives from transverse movement.

14. A package to secure a plurality of computer disk drives therein, said package comprising:
- a main insert including a plurality of compartments formed therein to receive the disk drives, said compartments arranged in at least one row extending in a longitudinal direction;
- a top cover for covering said compartments of said main insert, said top cover including an upper surface and a lower surface, a plurality of shock pads formed on said upper surface, said plurality of shock pads including end shock pads and intermediate shock pads wherein said end shock pads have a first height and said intermediate shock pads have a second higher height.

15. A package to secure a plurality of computer disk drives therein, said package comprising:
- a main insert including a plurality of compartments formed therein to receive the disk drives, said compartments arranged in at least one row extending in a longitudinal direction;
- a top cover for covering said compartments of said main insert, said top cover including an upper surface and a lower surface;
- a central rib separated from said main insert and extending along said longitudinal direction, said central rib contacting the disk drives loaded in said compartments and constraining the disk drives from transverse movement in the compartments; and
- a shell enclosing said top cover, said central rib and said main insert.

16. A package, as claimed in claim 15, wherein:
said central rib has a rectangular cross section.

17. A package, as claimed in claim 15, wherein:
said central rib has a circular cross section.

18. A package, as claimed in claim 15, wherein:
said central rib has a semi-circular cross section.

19. In combination, a package to secure a plurality of computer disk drives therein, said combination comprising:
- a plurality of disk drives, each disk drive having an interior edge and an opposing exterior edge, and each disk drive being individually placed in a separate flexible bag;
- a main insert including a plurality of compartments formed therein to receive the disk drives within their respective bags, said compartments arranged in at least one row extending in a longitudinal direction, each compartment of said plurality of compartments having an inner side wall and an outer side wall;
- a top cover for covering said compartments of said main insert, said top cover including an upper surface and a lower surface;
- a central rib placed in communication with said lower surface, said central rib forcing the disk drives loaded in said compartments within their respective bags against said outer side walls of said main insert thereby displacing the disk drives and constraining the disk drives from transverse movement in the compartments; and
- a shell enclosing said top cover, said central rib and said main insert.

20. The combination, as claimed in claim 19, wherein:
said at least one row is arranged in a pair of rows extending parallel to one another and in the longitudinal direction, said central rib contacting the bad surrounding each disk drive located in both said pair of rows of compartments and contraining the disk drives from transverse movement in their respective compartments.

21. The combination, as claimed in claim 19, further including:
a plurality of shock pads formed on said upper surface of said top cover.

22. The combination, as claimed in claim 19, further including:
a center flange formed on said upper surface of said top cover and extending in the longitudinal direction, said center flange adding structural support to said top cover.

23. The combination, as claimed in claim 21, wherein:
said plurality of shock pads includes an end pair of shock pads near an end of said top cover, said plurality of shock pads further including at least a pair of imtermediate shock pads spaced longitudinally from said end pair of shock pads.

24. The combination, as claimed in claim 23, wherein:
said end pair of shock pads have a first height and said pair of intermediate shock pads have a second higher height.

25. In combination, a package of disk drives, each disk drive having an interior edge and an opposing exterior edge, said disk drives positioned in flexible bags;
- a main insert including a plurality of compartments arranged in at least one row extending in a longitudinal direction, each compartment of said plurality of compartments having an inner side wall and an outer side wall;
- a top cover for covering said compartments of said main insert, said top cover including an upper surface and a lower surface; and
- means communicating longitudinally along said top cover to displacing the disk drives thereby causing the flexible bag surrounding each disk drive to maintain contact with the outer side walls of said main insert and thereby contraining the disk drives from transverse movement in the respective compartments.

26. The combination, as claimed in claim 25, wherein:
said at least one row is arranged in a pair of rows extending parallel to one another and in the longitudinal direction, said means for contacting positioned to contact the flexible bag surrounding each disk drive loaded in both said pair of rows of compartments and constraining the disk drives from transverse movement in their respective compartments.

27. The combination, as claimed in claim 25, further including:
- a plurality of shock pads formed on said upper surface of said top cover.

28. The combination, as claimed in claim 25, further including:
- a center flange formed on said upper surface of said top cover and extending in the longitudinal direction, said center flange adding structural support to said top cover.

29. The combination, as claimed in claim 27, wherein:
- said plurality of shock pads includes an end pair of shock pads positioned near an end of said top cover, said plurality of shock pads further including at least a pair of intermediate shock pads spaced longitudinally from said end pair of shock pads.

30. The combination, as claimed in claim 29, wherein:
- said end pair of shock pads have a first height and said pair of intermediate shock pads have a second higher height.

31. In combination, a package to secure a plurality of computer disk drives therein, said combination comprising:
- a plurality of disk drives, each disk drive having an interior edge and an exterior edge and each disk drive positioned in a flexible bag;
- a main insert including a plurality of compartments formed therein to receive the disk drives within their respective bags, said compartments arranged in at least one row extending in a longitudinal direction, said plurality of compartments being defined by at least two corresponding side walls, one of said side walls being an outer side wall;
- a top cover for covering said compartments of said main insert, said top cover including an upper surface and a lower surface; and
- means communicating longitudinally along said top cover for contacting the individually bagged disk drives and for displacing the individually bagged disk drives such that the bagged disk drives remain in contact with said outer side walls of said compartments and are constrained from transverse movement.

32. A package to secure a plurality of computer disk drives therein, said package comprising:
- a main insert including a plurality of compartments formed therein to receive disk drives positioned in individual bags, said compartments arranged in at least one row extending in a longitudinal direction;
- a top cover for covering said compartments of said main insert, said top cover including an upper surface and a lower surface, a plurality of shock pads formed on said upper surface, said plurality of shock pads including end shock pads and intermediate shock pads wherein said end shock pads have a first height and said intermediate shock pads have a second higher height.

33. A package to secure a plurality of computer disk drives stored in plastic bags, said package comprising:
- a main insert including a plurality of compartments formed therein to receive the disk drives within their respective bags, said compartments arranged in at least one row extending in a longitudinal direction;
- a top cover for covering said compartments of said main insert, said top cover including an upper surface and a lower surface;
- a central rib separated from said main insert and extending along said longitudinal direction, said central rib constraining the disk drives from transverse movement in the compartments; and
- a shell enclosing said top cover, said central rib and said main insert.

34. A package, as claimed in claim 33, wherein:
- said central rib has a rectangular cross section.

35. A package, as claimed in claim 33, wherein:
- said central rib has a circular cross section.

36. A package, as claimed in claim 33, wherein:
- said central rib has a semi-circular cross section.

37. The combination of claim 19, wherein said flexible bags have anti-static characteristics.

38. The combination of claim 25, wherein said flexible bags have anti-static characteristics.

39. The combination of claim 31, wherein said flexible bags have anti-static characteristics.

* * * * *